(12) United States Patent
Kunjur

(10) Patent No.: US 11,436,241 B2
(45) Date of Patent: Sep. 6, 2022

(54) ENTITY RESOLUTION BASED ON CHARACTER STRING FREQUENCY ANALYSIS

(71) Applicant: FAIR ISAAC CORPORATION, San Jose, CA (US)

(72) Inventor: Girish Kunjur, Houston, TX (US)

(73) Assignee: Fair Isaac Corporation, Roseville, MN (US)

( * ) Notice: Subject to any disclaimer, the term of this patent is extended or adjusted under 35 U.S.C. 154(b) by 447 days.

(21) Appl. No.: 16/506,792

(22) Filed: Jul. 9, 2019

(65) Prior Publication Data

US 2021/0011909 A1    Jan. 14, 2021

(51) Int. Cl.
 *G06F 16/24* (2019.01)
 *G06F 40/284* (2020.01)
 *G06F 16/2458* (2019.01)
 *G06F 16/2457* (2019.01)

(52) U.S. Cl.
 CPC .... *G06F 16/2462* (2019.01); *G06F 16/24578* (2019.01); *G06F 40/284* (2020.01)

(58) Field of Classification Search
 CPC ........... G06F 16/2462; G06F 16/24578; G06F 40/284; G06F 40/295; G06F 40/129; G06Q 30/0185; G06Q 30/0609; G06Q 50/01
 See application file for complete search history.

(56) References Cited

U.S. PATENT DOCUMENTS

| | | | | |
|---|---|---|---|---|
| 10,534,782 B1* | 1/2020 | Gudur | ................. | G06F 16/3344 |
| 2008/0243832 A1* | 10/2008 | Adams | ................. | G06F 16/334 |
| | | | | 707/999.005 |
| 2014/0156263 A1* | 6/2014 | Patman Maguire | .... | G06F 40/30 |
| | | | | 704/9 |
| 2020/0327150 A1* | 10/2020 | Kunjur | ................ | G06F 16/3334 |

* cited by examiner

*Primary Examiner* — Alford W Kindred
*Assistant Examiner* — Cecile H Vo
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented methods, systems and products for character string frequency analysis. The method includes a set of operations or steps, including parsing a plurality of character strings into one or more tokens, categorizing the one or more tokens into one or more token frequency categories, and generating a first similarity score between one or more pairs of character strings of the plurality of character strings. The method further includes calculating one or more degrees of commonality or rarity of the plurality of character strings based on the categorizing, generating one or more penalties for token pairs of the one or more pairs of character strings associated with the first similarity score based on the one or more degrees of commonality or rarity and the categorizing, and generating a second similarity score based the first similarity score and the one or more penalties.

20 Claims, 6 Drawing Sheets

ENTITY RESOLUTION BASED ON CHARACTER STRING FREQUENCY ANALYSIS

TECHNICAL FIELD

The subject matter described herein relates to resolving of entities in character strings, and more particularly to a system and method for name frequency analysis for entity resolution.

BACKGROUND

Computer-implemented fraud detection systems are conventionally used for stopping financial crimes, bolstering security and ensuring regulatory compliance. An effective fraud detection system would enable institutions to perform social network analysis, and resolve identities and hidden relationships by linking across disparate internal and third-party data sources.

When dealing with large amounts of names from many disparate data sources, such as various social networks, for example, a similarity analysis algorithm may be implemented to distinguish between same or similar names. Similarity is typically computed based on various parameters such as lexical closeness (John vs. John), synonym variations (John vs. Jack), and sound similarity (Ashley vs. Ashleigh).

The above approaches are often not sufficiently accurate because certain similar names that do not exactly match cannot be identified properly or efficiently, depending on how the similarity analysis is performed.

SUMMARY

This document describes a system and method for entity resolution based on character string frequency analysis.

In one aspect, a computer-implemented method for character string frequency analysis for entity resolution includes a set of operations or steps, including parsing a plurality of character strings into one or more tokens, categorizing the one or more tokens into at least one of one or more token frequency categories, and generating a first similarity score between one or more pairs of character strings of the plurality of character strings based on one or more of lexical, synonymic and sound similarities or differences. The computer-implemented method further includes calculating one or more degrees of commonality or rarity of the plurality of character strings based on the categorizing of the one or more tokens, generating one or more penalties for token pairs of the one or more pairs of character strings associated with the first similarity score based on the one or more degrees of commonality or rarity and the categorizing of the one or more tokens, and generating a second similarity score based the first similarity score and the one or more penalties.

In some variations, one or more of the following may optionally be included. The generating of the first similarity score between the one or more pairs of character strings may include identifying the token pairs of the one or pairs of character strings, and identifying one or more similarities between the identified token pairs, the one or more similarities including one or more of lexical similarities, synonymic properties and sound closeness. The generating of the first similarity score between the one or more pairs of character strings may include identifying the token pairs of the one or pairs of character strings, and identifying one or more non-token variations between the identified token pairs, the one or more non-token variations including one or more of missing tokens and added tokens. The categorizing the one or more tokens may use a locale-specific lookup table. The calculating the one or more degrees of commonality or rarity may use a sigmoid function. The one or more penalties may comprise token penalties associated with differences between the tokens in the token pairs. The token penalties may be generated based on both the one or more degrees of commonality and rarity. The one or more penalties may include non-token penalties associated with added or missing tokens in the one or more pairs of character strings. The non-token penalties may be generated based on both the one or more degrees of commonality and rarity. The computer-implemented method may further include storing, by the one or more computer processors, the second similarity score in a similarity index of a database.

Implementations of the current subject matter can include, but are not limited to, systems and methods consistent with the disclosure herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Where practical, the same or similar reference numbers denote the same or similar or equivalent structures, features, aspects, or elements, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

To address the aforementioned and potentially other issues with currently available solutions, this document presents methods, systems, articles of manufacture, and the like consistent with one or more implementations of the current subject matter can, among other possible advantages, provide a system and method for character string frequency analysis (e.g., name frequency analysis) for entity resolution. It is preliminarily noted that when character strings, such as names, that are being compared occur frequently, there is a reduced likelihood that the similar character strings or names represent the same entity. Conversely, when the names being compared are rare, there is a higher likelihood that the names represent the same entity.

As an example, consider the following two character strings or names: "John E Smith" vs. "John B Smith". These two names are extremely common in the United States. The change of one initial may well be a different person. On the flip side, consider two rarer names with exactly the same variation, such as: "Bjorn E Bastrop" vs. "Bjorn B Bastrop". Owing to the extremely rare nature of this name pair, and given certain geographic locales, these two are more likely to be the same person than the first pair. Without performing frequency analysis, these two pairs would score about the same. As a consequence, not considering frequencies for entity resolution can cause unrelated names to cluster into the same entity, and conversely all names or variations associated with an entity may not be fully discovered. Accordingly, what is needed is a system and method for name frequency analysis for entity resolution, and which effectively includes locale-specific frequency information.

Figure 1:
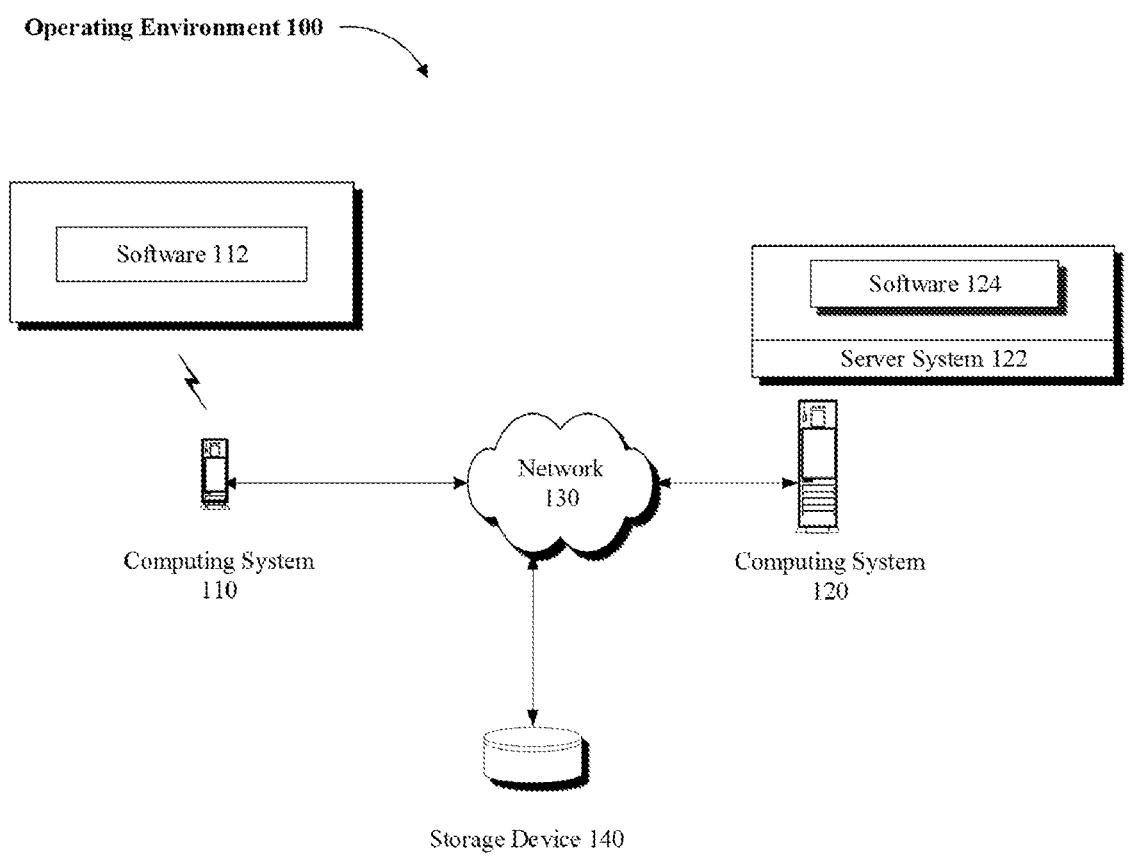
FIG. 1 illustrates an example operating environment in accordance with one or more embodiments, wherein the operations and functionalities disclosed herein may be implemented.

Referring to FIG. 1, an example operating environment 100 is illustrated in which a computing system 110 may be used by a user to interact with software 112 being executed on computing system 110. The computing system 110 may be a general purpose computer, a handheld mobile device (e.g., a smart phone), a tablet, or other communication capable computing device. Software 112 may be a web browser, a dedicated app or other type of software application running either fully or partially on computing system 110.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with a unique approach to provide a system and method for name frequency analysis for entity resolution.

Figure 2:
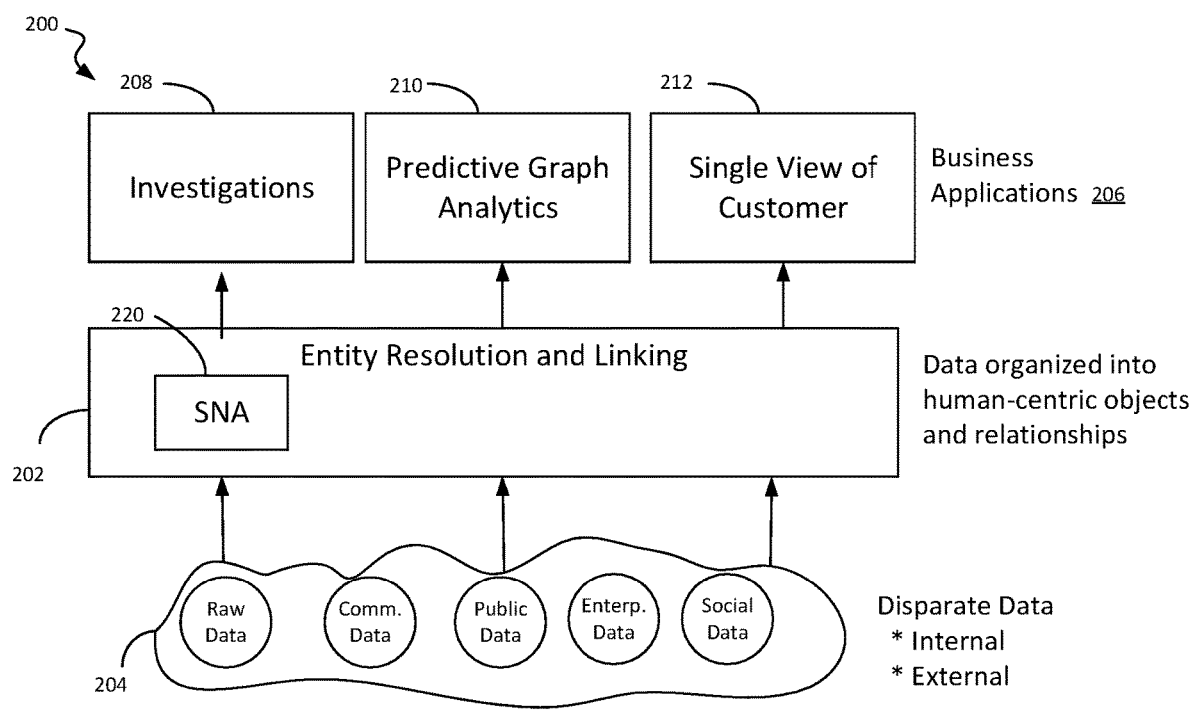
FIG. 2 is an example diagram illustrating a system for entity resolution and linking, in accordance with one or more embodiments.

FIG. 2 is a use case diagram illustrating a system 200 for entity resolution and linking. In accordance with some implementations of the system 200, an Identity Resolution Engine (IRE) 202 is employed. The IRE 202 performs entity resolution and linking on disparate data 204, which can be a combination of internal and external data. The disparate data 204 can include one or more of raw data, commercial data, public data, enterprise data, social data, or the like. The IRE 202 organizes the disparate data 204 into human-centric objects and relationships, which can then be sent to one or more business applications 206 such as investigations 208, predictive graph analytics 210, or customer view 212.

Human-centric organization may comprise taking a record from a customer database, and breaking it down into meaningful components. For example, an application for credit may be broken down into a person's name, a social security number (SSN) of the person, an address, phone information, etc. The IRE 202 may perform this using user configuration information provided by the user. For example, the user may provide clues to IRE 202 via configuration information and the IRE 202 may use the configuration information to break down the disparate data 204 into components as described above.

Figure 3:
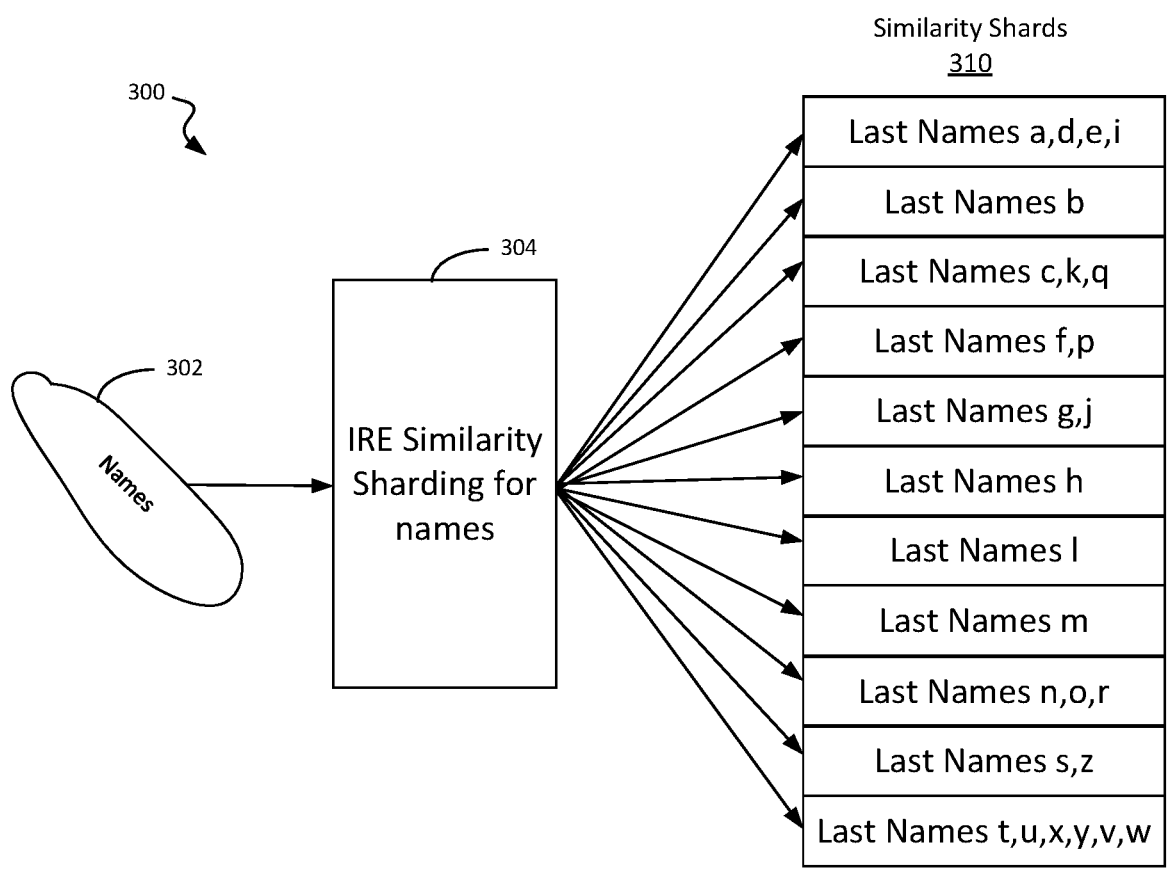
FIG. 3 illustrates one example of similarity sharding, in accordance with one or more embodiments.

FIG. 3 illustrates one example of similarity sharding, in this case similarity sharding for people based on their names. In this example, an IRE 304 receives a list of names 302 (e.g., received via the network 130) and sorts them into a plurality of similarity shards 310. The similarity shards 310, in this example, are divided into 11 separate shards comprising peoples' names with last names starting with different letters of the alphabet.

The IRE 202 exploits the primary weakness of fraud perpetrators and other financial criminals and organized networks, which is the reuse of identity information (such as names, phone numbers, addresses, etc.). The IRE 202 performs a federated search that provides seamless access to disparate and remote data sources and pieces together both exact and inexact (fuzzy) linkages based on, for example, criminals' recycled data. In addition, institutions can generate, using the IRE 202, detailed match results to establish true identities ("who's who"), discover hidden or non-obvious relationships and networks ("who knows whom"), and then view results in a clear computer-generated pictorial display format that drives timely action.

The IRE 202 includes a social network analysis (SNA) 220 that proactively identifies and prioritizes organized fraud and criminal activities using relationship-driven predictive analytics. The SNA 220 leverages organized crime rings' biggest weakness—shared identity data—to identify who's who and who knows whom across enterprise and third-party data. The SNA 220 uses this information to build a relationship-based network to identify and score behavior. As a result, organizations can achieve dramatically higher detection rates and lower false positives compared to traditional rules-based or analytic fraud solutions.

A relationship-based network can be a graph depicting the linkage between customer data, and the human-centric components (referred to as entities) that the IRE 202 identified from customer data. For example the relationship-based network could link a customer record to multiple addresses, and a social security number (SSN). The SSN may be linked to another customer record. The IRE 202 can do this by first extracting the entities from customer documents, and then clustering similar entities together.

For example, if 2 addresses from 2 different records are similar enough, they would be considered the same address. Higher detection rates may then be achieved owing to the ability of the IRE 202 to cluster similar entities as described above. For example, if a customer record appears 10 times with 10 slightly different addresses, which are similar enough to be the same address, then the IRE 202 can detect a similarity between all 10 addresses, and link it to other customer records that have that address. Without clustering of similar entities, these other customer records cannot be found as efficiently.

Figure 5:
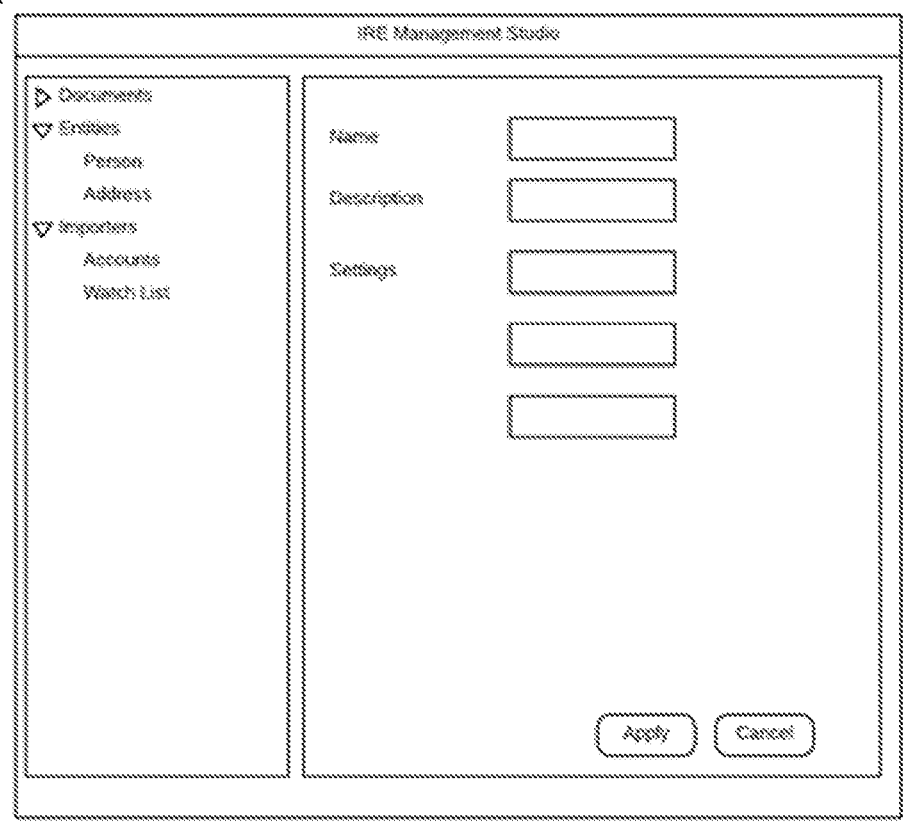
FIG. 5 illustrates an example of an Identity Resolution Engine Management Studio (IRE-MS) interface, in accordance with one or more embodiments.

The IRE 202 may connect to existing and new data sources via an Identity Resolution Engine Management Studio (IRE-MS) interface, a web-based administrative tool providing an intuitive interface for configuring and managing the IRE 202 and IRE system 200. FIG. 5 illustrates an example of an IRE-MS interface 500. The IRE-MS interface 500 may be part of the server system 122 on the computing system 120. Accordingly, the IRE 202 may support multiple database platforms, provide flexible licensing models, integrate easily into existing infrastructures and require no special training, only standard database administration (DBA).

The IRE 202 uses a novel approach incorporating frequency analysis to influence its judgement on whether any two names belong to the same entity or not. As a result the IRE 202 can generate more accurate similarity scores and thereby can resolve entities more accurately. Frequency analysis is also used by the IRE 202 for better performance when dealing with large amounts of name data.

Figure 4:
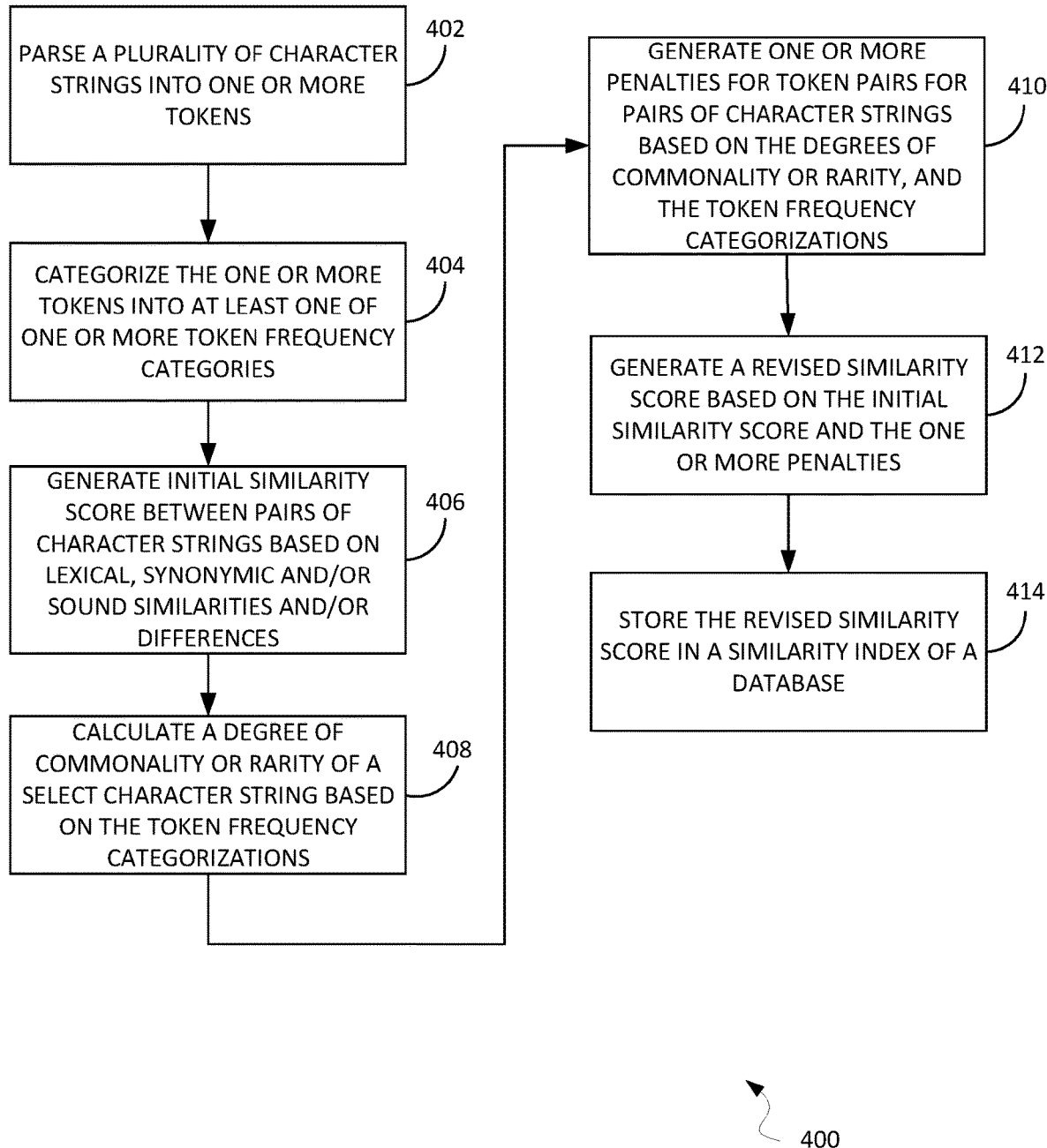
FIG. 4 illustrates a method for determining a similarity score between two or more character strings, in accordance with one or more embodiments.

FIG. 4 illustrates a method 400 for determining a similarity score between two or more character strings (e.g., names). Similarity analysis may start by considering two character strings (e.g., a name pair) with a goal of determining the similarity between the two character strings. At 402, the IRE 202 parses the character string pairs into one or more tokens using two parsing operations. In some example embodiments, parsing a character string may include analyzing the character string in terms of grammatical constituents, identifying parts of speech, identifying syntactic relations, etc. When parsing one of the character strings, in some example embodiments, the IRE 202 breaks up or parses the character string into tokens, or words. In some example embodiments, the parsing of character strings may also include the IRE 202 joining words together that together make a token or word.

The parsing of the character string is performed in a datatype-specific way for individual characters. For example, the parsing of an address into tokens may consider a slash character "/" as a valid character, while the parsing of a name may not consider the slash character. Further, the parsing may consider datatype specific synonyms as well. As discussed above, parsing a character string may include the IRE 202 breaking up the character string into tokens. For example, breaking up a character string may include breaking up the character string "John Smith, 123 First Street, New York, N.Y." into a first name token "John," a last name token "Smith," a street address token "123 First Street" a city token "New York" and a state abbreviation token "NY." As further described above, parsing may also include joining two or more strings of characters or words together to form a single word or token. For example, if two words comprise a synonym of a compound word (e.g., "Mary Ann" is a synonym of Maryann and Marianne), then both words could be joined together as one token.

At 404, in one embodiment, the IRE 202 categorizes the one or more tokens into at least one of one or more token frequency categories. In one embodiment, the token frequency categories may include three categories: common, known or rare.

The categorization at 402 may comprise the use of thresholds. Using names as an example of the character strings, a first name (or token) may be categorized as common if it accounts for an upper percentage or more of all first names. A first name (or token) may be categorized as rare if it accounts for less than a lower threshold of all first names (or tokens). An upper percentage may be in a range of 5% to 10% while a lower percentage may be on a range of 0.01% to 0.1%, both depending on implementation or the type of token being categorized. These upper and lower percentages may be modified by a user.

A first name (or token) falling between the upper and lower percentages is categorized as known. The categorization at 404 may comprise use of a customizable locale-specific lookup table. The customizable locale-specific lookup table may be developed using a frequency analysis of different token character strings for a specific locale. For example, a locale-specific lookup table of last names in China may be developed using a list of all last names contained in a database. Other locale-specific lookup tables may be developed for other forms of tokens.

At 406, the IRE 202 generates a first similarity score between pairs of character strings of the plurality of character strings based on lexical, synonymic and/or sound similarities and/or differences. The IRE 202 identifies token pairs between two character strings to compare. The IRE 202 identifies various similarities and/or differences between the identified token pairs including, for example, lexical similarities, synonymic properties, sound closeness, etc. The IRE 202 then generates token based scores for the identified token pairs. The IRE 202 also identifies non-token variations between the identified token pairs. Non-token variations may include, for example, missing tokens or added tokens. The IRE 202 then generates non-token based scores for the identified token pairs. The token based scores and the non-token based scores are combined to generate the first similarity score between the pairs of character strings.

At 408, the IRE 202 calculates a degree of commonality or rarity of a character string based on the categorizing of the tokens in the character string into the token frequency categories performed at 404. The degree of commonality or rarity may be calculated using a sigmoid function with respect to the number of tokens in a given category. The sigmoid function may be used to produce a probability measure between a range of 0 and 1 and the resulting probability measure or values may be used to help introduce nonlinearity to the degree of commonality and rarity calculations. Desirably, the sigmoid function results in a fast rising probability measure for initial matches and results in a slower rising probability measure for later matches. Other functions that may be used to calculate the degree of commonality or rarity are hyperbolic tangent, generalized logistic function, various algebraic functions, and others.

Accordingly, the degree of commonality or rarity can be represented as a probability measure. The probability measure represents a degree of commonality or rarity of a select token in a select token frequency category. Overall degree of commonality or rarity can be represented in two probability measures referred to as commonality and rarity. Both these values exist for character strings to varying degrees. Generally, a higher rarity measure indicates a rare character string, and a higher commonality measure indicates a common character string.

Rarity has a direct relation to the number of token pairs that are rare matches. A token pair represents two tokens from two different character strings that are compared with each other. A rare token pair is a token pair containing at least one rarely-occurring token, while a common token pair is a token pair containing both commonly occurring tokens. Normally one rare token pair is sufficient to increase rarity to a high value. A typical high value for rarity is 0.9 out of 1.0. Rarity is also adjusted downwards to a lesser extent when there are existing common or known token pair matches.

Commonality, likewise, has a direct relation to the number of token pairs that are common matches. However, commonality is more severely affected by even one rare token. Using a name as an example of a character string, a name like John E. Smith includes three common tokens and therefore has a high commonality measure. However, the addition of one rare token is sufficient to make the name rare, even though the common tokens may outnumber the rare token. For example, the addition of Kunjar, resulting in "John E. Smith Kunjar," would make the whole name have a high rarity measure. Rare token pairs are weighted to reduce commonality dramatically. For example, when considering "John Bastrop" vs. "John Baxtrop", the name has a high rarity owing to the last name, even though "John" is a commonly occurring token pair. Rarity, on the other hand is not typically reduced as highly by commonality.

At 410 and 412, the IRE 202 applies the calculated degree of commonality and rarity probability measures to the first similarity score generated at 406 to arrive at an overall revised similarity score, using a token-level penalty procedure. A token penalty is any penalty applied to a similarity score owing to differences within an existing token pair. For example, a penalty of 0.01 may be exercised when comparing "John E Smith" and "John Smit", owing to the slight lexical difference in the token pair containing Smith and Smit. A non-token penalty is a penalty applied to a similarity score owing to any differences not related to any token pairs. For example, a penalty of 0.01 may be exercised in the above example for the insertion of a middle initial after the first name.

Token penalties for rare token pairs will receive a downward adjustment that is proportional to rarity. Token penalties for common token pairs will receive an upward adjustment that is proportional to the commonality. Similarly, the non-token penalty will be adjusted by both the rarity and commonality. When rarity is higher than commonality, this typically means that non-token penalties will decrease for rare names, and vice-versa.

At 410, the IRE 202 generates one or more penalties for token pairs for pairs of character strings associated with the first similarity score, the one or more token pairs based on the degrees of commonality or rarity calculated at 408 and the token frequency categorizations determined at 404 . . . . The one or more penalties can include token penalties and non-token penalties, as discussed above.

The token penalty and non-token penalty of the one or more token pairs can be generated based on a degree of the commonality or rarity probability measures of the token pairs. The token penalty for a rare token pair may be determined to be in a low range, the degree of lowness being proportional to the degree of rarity of the token pair. The token penalty for a common token pair may be determine to be in a high range, the degree of highness being proportional to the commonality.

At 412, the IRE 202 generates a revised similarity score based on the first similarity score and on the one or more penalties, e.g., the token penalty and the non-token penalty, generated at 410.

At 414, the IRE 202 stores the revised similarity score in a similarity index of a database such as stored in storage device 140 of FIG. 1.

Frequency analysis of character strings may also be used in the similarity indices of the IRE 202 to help reduce the candidate set more effectively. For instance, using names as an example of character strings, a common name will tend to have a large candidate set owing to its high frequency in the data. The candidate set is reduced by the IRE 202 by disqualifying more remote variations when encountering a common name, which would otherwise be considered for a rare name. For example, when fuzzy searching for "John Baxtrop" the name index of the IRE 202 may be implemented to consider potential candidates that contain multiple inserted tokens (John E Baxtrop), double letter insertions (John E Baxystrop), among a host of other variations. Some of these variations may be reduced when considering candidates for "John Smith", as it is a more common name. Additionally, rare names that are lexically close enough to a common name are also treated like common names by the index (e.g., "John Smith"), and hence they will have a reduced candidate set as well. The reduced candidate set in these cases results in better performance of similarity searching, and clustering.

Figure 6:
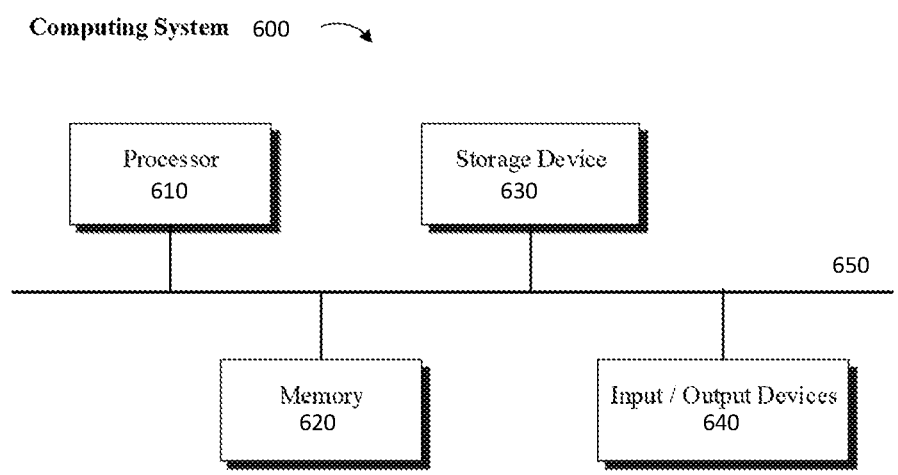
FIG. 6 is a block diagram of a computing system that may be utilized to perform one or more computer processes disclosed herein as consistent with one or more embodiments.

Referring to FIG. 6, a block diagram illustrating a computing system 600 consistent with one or more embodiments is provided. The computing system 600 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 6, the computing system 600 may include a processor 610, a memory 620, a storage device 630, and input/output devices 640. The processor 610, the memory 620, the storage device 630, and the input/output devices 640 may be interconnected via a system bus 650. The processor 610 is capable of processing instructions for execution within the computing system 600. Such executed instructions may implement one or more components of, for example, a cloud platform. In some implementations of the current subject matter, the processor 610 may be a single-threaded processor. Alternately, the processor 610 may be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 may store data structures representing configuration object databases, for example. The storage device 630 is capable of providing persistent storage for the computing system 600. The storage device 630 may be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 may provide input/output operations for a network device. For example, the input/output device 640 may include Ethernet ports or other networking ports to communicate with one or more wired and/or wireless networks (e.g., a local area network (LAN), a wide area network (WAN), the Internet).

In some implementations of the current subject matter, the computing system 600 may be used to execute various interactive computer software applications that may be used for organization, analysis and/or storage of data in various (e.g., tabular) format (e.g., Microsoft Excel®, and/or any other type of software). Alternatively, the computing system 600 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 640. The user interface may be generated and presented to a user by the computing system 600 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method comprising:
   receiving, using at least one processor, a request to resolve an entity represented by one or more first character strings;
   querying, using the at least one processor, via a communication network, in response to the received request, a plurality of second character strings stored in one or more disparate data sources, identifying, using a federated search, one or more second character strings in the plurality of second character strings being similar to the one or more first character strings, retrieving the one or more second character strings from the one or more disparate data sources, and clustering the one or more second character strings based on at least one similarity parameter to cause the at least one processor to execute a resolution of the entity;
   executing, using the at least one processor, the resolution of the entity by
      parsing the one or more first character strings and the one or more clustered second character strings into one or more tokens;
      categorizing the one or more tokens into at least one of one or more token frequency categories;
      generating a first similarity score between one or more pairs of character strings selected from the one or more first character strings and the one or more clustered second character strings based on one or more of lexical, synonymic and sound similarities or differences;
      calculating one or more degrees of commonality or rarity of the one or more first character strings and the one or more clustered second character strings based on the categorizing of the one or more tokens;
      generating one or more penalties for token pairs of the one or more pairs of character strings associated with the first similarity score based on the one or more degrees of commonality or rarity and the categorizing of the one or more tokens; and
      generating a second similarity score based the first similarity score and the one or more penalties;
   resolving, using the at least one processor, the entity based on the generated second similarity score; and
   transmitting, using the at least one processor, via the communication network, the resolved entity for processing by at least one application.

2. The computer-implemented method in accordance with claim 1, wherein generating the first similarity score between the one or more pairs of character strings comprises:
   identifying the token pairs of the one or pairs of character strings; and
   identifying one or more similarities between the identified token pairs, the one or more similarities including one or more of lexical similarities, synonymic properties and sound closeness.

3. The computer-implemented method in accordance with claim 1, wherein generating the first similarity score between the one or more pairs of character strings comprises:
   identifying the token pairs of the one or pairs of character strings; and
   identifying one or more non-token variations between the identified token pairs, the one or more non-token variations including one or more of missing tokens and added tokens.

4. The computer-implemented method in accordance with claim 1, wherein categorizing the one or more tokens uses a locale-specific lookup table.

5. The computer-implemented method in accordance with claim 1, wherein calculating the one or more degrees of commonality or rarity uses a sigmoid function.

6. The computer implemented method in accordance with claim 1, wherein the one or more penalties comprise token penalties associated with differences between the tokens in the token pairs.

7. The computer-implemented method in accordance with claim 6, wherein the token penalties are generated based on both the one or more degrees of commonality and rarity.

8. The computer implemented method in accordance with claim 1, wherein the one or more penalties comprise non-token penalties associated with added or missing tokens in the one or more pairs of character strings.

9. The computer-implemented method in accordance with claim 8, wherein the non-token penalties are generated based on both the one or more degrees of commonality and rarity.

10. The computer-implemented method in accordance with claim 1, further comprising storing, by the one or more computer processors, the second similarity score in a similarity index of a database.

11. A system comprising:
    at least one programmable processor;
    a non-transitory machine-readable medium storing instructions that, when executed by the at least one programmable processor, cause the at least one programmable processor to perform operations comprising:
       receiving a request to resolve an entity represented by one or more first character strings;
       querying, via a communication network, in response to the received request, a plurality of second character strings stored in one or more disparate data sources, identifying, using a federated search, one or more second character strings in the plurality of second character strings being similar to the one or more first character strings, retrieving the one or more second character strings from the one or more disparate data sources, and clustering the one or more second character strings based on at least one similarity parameter to cause the at least one programmable processor to execute a resolution of the entity;

executing the resolution of the entity by
parsing the one or more first character strings and the one or more clustered second character strings into one or more tokens;
categorizing the one or more tokens into at least one of one or more token frequency categories;
generating a first similarity score between one or more pairs of character strings selected from the one or more first character strings and the one or more clustered second character strings based on one or more of lexical, synonymic and sound similarities or differences;
calculating one or more degrees of commonality or rarity of the one or more first character strings and the one or more clustered second character strings based on the categorizing of the one or more tokens;
generating one or more penalties for token pairs of the one or more pairs of character strings associated with the first similarity score based on the one or more degrees of commonality or rarity and the categorizing of the one or more tokens; and
generating a second similarity score based the first similarity score and the one or more penalties;
resolving the entity based on the generated second similarity score; and
transmitting via the communication network, the resolved entity for processing by at least one application.

12. The system in accordance with claim 11, wherein generating the first similarity score between the one or more pairs of character strings comprises:
identifying the token pairs of the one or pairs of character strings; and
identifying one or more similarities between the identified token pairs, the one or more similarities including one or more of lexical similarities, synonymic properties and sound closeness.

13. The system in accordance with claim 11, wherein generating the first similarity score between the one or more pairs of character strings comprises:
identifying the token pairs of the one or pairs of character strings; and
identifying one or more non-token variations between the identified token pairs, the one or more non-token variations including one or more of missing tokens and added tokens.

14. The system in accordance with claim 11, wherein categorizing the one or more tokens uses a locale-specific lookup table.

15. The system in accordance with claim 11, wherein calculating the one or more degrees of commonality or rarity uses a sigmoid function.

16. A computer program product comprising a non-transitory machine-readable medium storing instructions that, when executed by at least one programmable processor, cause the at least one programmable processor to perform operations comprising:
receiving a request to resolve an entity represented by one or more first character strings;
querying, via a communication network, in response to the received request, a plurality of second character strings stored in one or more disparate data sources, identifying, using a federated search, one or more second character strings in the plurality of second character strings being similar to the one or more first character strings, retrieving the one or more second character strings from the one or more disparate data sources, and clustering the one or more second character strings based on at least one similarity parameter to cause the at least one programmable processor to execute a resolution of the entity;

executing the resolution of the entity by
parsing the one or more first character strings and the one or more clustered second character strings into one or more tokens;
categorizing the one or more tokens into at least one of one or more token frequency categories;
generating a first similarity score between one or more pairs of character strings selected from the one or more first character strings and the one or more clustered second character strings based on one or more of lexical, synonymic and sound similarities or differences;
calculating one or more degrees of commonality or rarity of the one or more first character strings and the one or more clustered second character strings based on the categorizing of the one or more tokens;
generating one or more penalties for token pairs of the one or more pairs of character strings associated with the first similarity score based on the one or more degrees of commonality or rarity and the categorizing of the one or more tokens; and
generating a second similarity score based the first similarity score and the one or more penalties;
resolving the entity based on the generated second similarity score; and
transmitting, via the communication network, the resolved entity for processing by at least one application.

17. The computer program product in accordance with claim 16, wherein generating the first similarity score between the one or more pairs of character strings comprises:
identifying the token pairs of the one or pairs of character strings; and
identifying one or more similarities between the identified token pairs, the one or more similarities including one or more of lexical similarities, synonymic properties and sound closeness.

18. The computer program product in accordance with claim 16, wherein generating the first similarity score between the one or more pairs of character strings comprises:
identifying the token pairs of the one or pairs of character strings; and
identifying one or more non-token variations between the identified token pairs, the one or more non-token variations including one or more of missing tokens and added tokens.

19. The computer program product in accordance with claim 16, wherein categorizing the one or more tokens uses a locale-specific lookup table.

20. The computer program product in accordance with claim 16, wherein calculating the one or more degrees of commonality or rarity uses a sigmoid function.

* * * * *